United States Patent [19]
Nelson et al.

[11] Patent Number: 5,350,114
[45] Date of Patent: Sep. 27, 1994

[54] MICROPROCESSOR CONTROLLER FOR DIESEL FUEL FIRED HEATER

[75] Inventors: Kirk A. Nelson, Minneapolis; William A. Byrnes, Brooklyn Center, both of Minn.

[73] Assignee: The Budd Company, Troy, Mich.

[21] Appl. No.: 95,650

[22] Filed: Jul. 21, 1993

[51] Int. Cl.⁵ .............................................. G05D 23/00
[52] U.S. Cl. .............................. 237/2 A; 237/12.3 C; 123/142.5 R
[58] Field of Search ............. 237/2 A, 12.3 B, 12.3 C; 123/142.5 R

[56] References Cited
PUBLICATIONS

Gordon Kelling, Kirk Nelson and Bill Byrnes, SAE Technical Paper Series No. 922434 "Diesel Fuel Fired Heaters", Nov. 16, 1992.

Primary Examiner—Henry A. Bennett
Attorney, Agent, or Firm—Harness, Dickey & Pierce

[57] ABSTRACT

A diesel heater includes a combustion chamber and a fuel pump for pumping diesel fuel to the combustion chamber. An air supply device supplies combustion air to the combustion chamber. An igniter ignites the diesel fuel to generate combustion heat. A heat exchange fluid supplying device supplies fluid in heat exchange relationship with the combustion heat. A thermal sensor in contact with the heat exchange fluid generates a temperature signal related to the temperature of the heat exchange fluid. A flame detector detects an ignited diesel fuel flame and generates a flame signal in response thereto. A microprocessor includes a memory and a plurality of input/output ports wherein the input/output ports are electrically connected to the thermal sensor, the fuel pump, the heat transfer fluid supplying device, the igniter, the combustion air supply device, and the flame detector. The memory stores a normal operating sequence, a start-up sequence, and a tail start period for the start-up sequence. An input device allows the current day and current time to be entered into the microprocessor memory. The microprocessor thereafter updates the current day and current time. A lower threshold temperature for the heat exchange fluid is entered into the microprocessor memory by the input device. A start day and start time are also entered into the microprocessor memory by the input device. The microprocessor automatically initiates the start-up sequence when the heat transfer fluid falls below the lower threshold temperature or when the current day and the current time equal the start day and the start time. The microprocessor executes the normal operating sequence when the flame signal is received.

21 Claims, 12 Drawing Sheets

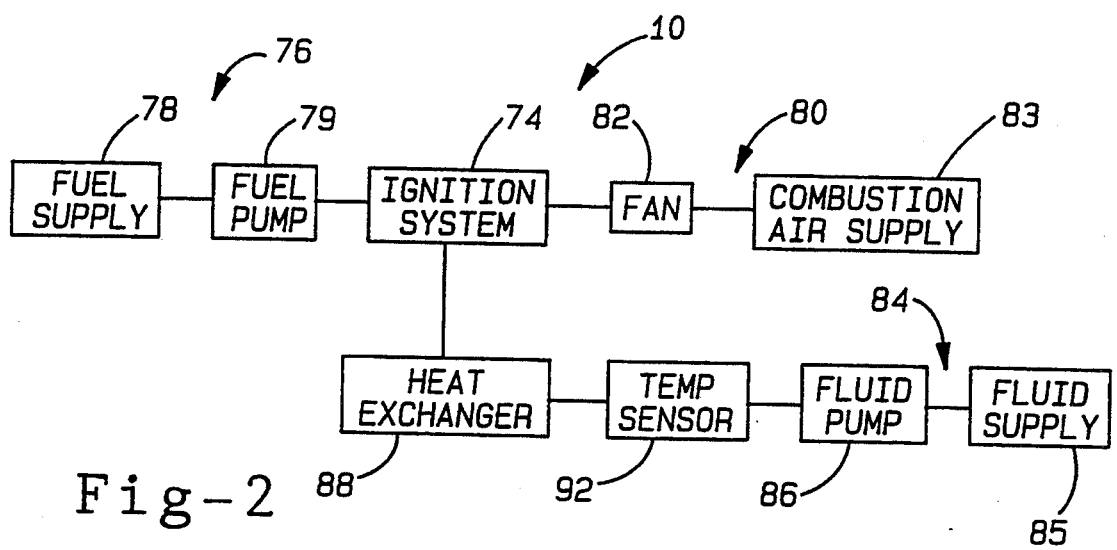
Fig-2
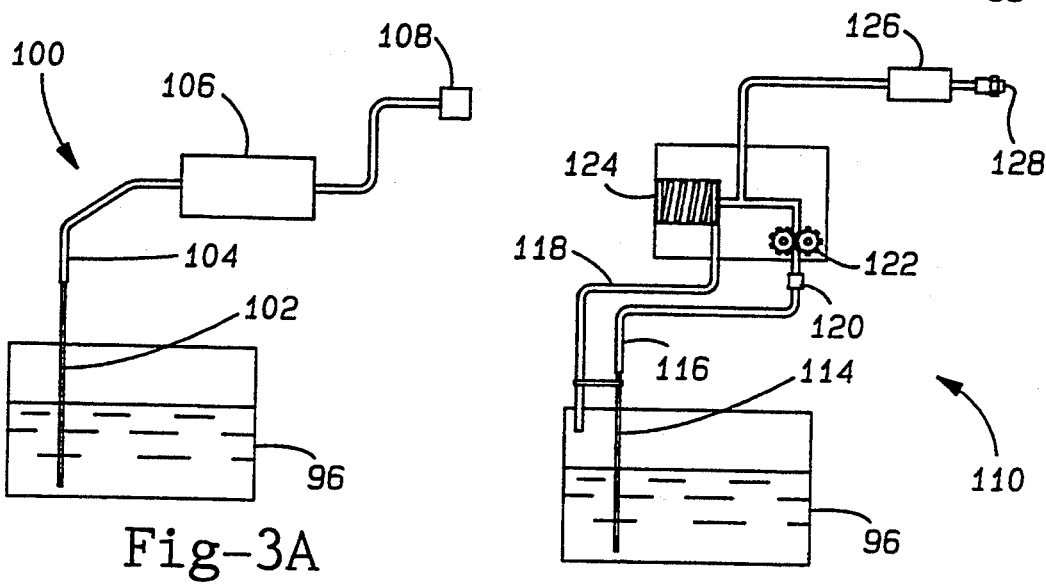
Fig-3A
Fig-3B
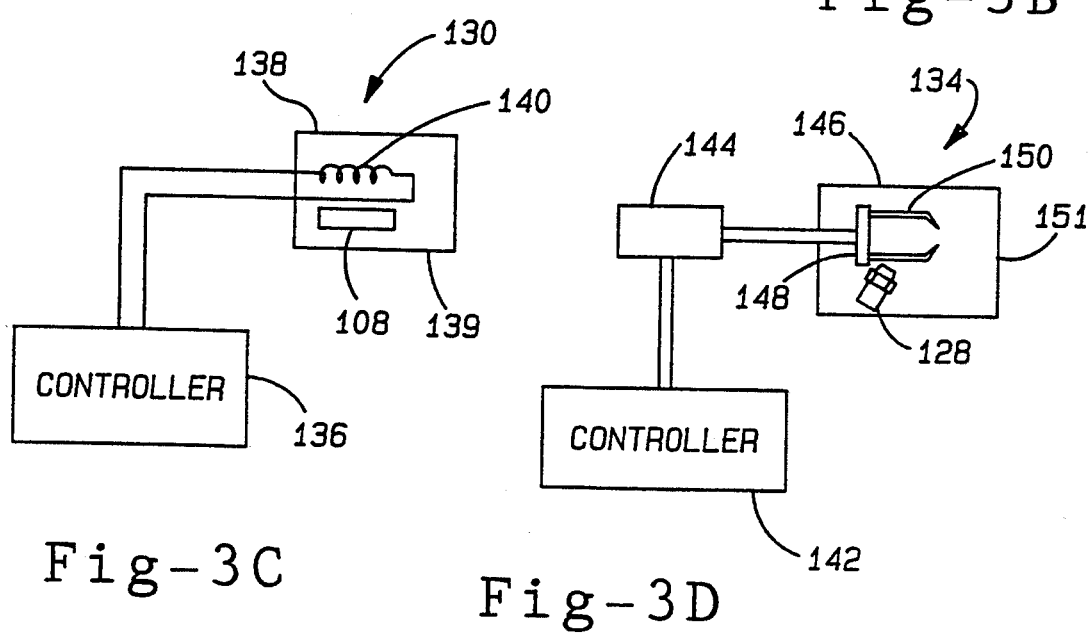
Fig-3C
Fig-3D 5,350,114

MICROPROCESSOR CONTROLLER FOR DIESEL FUEL FIRED HEATER

BACKGROUND OF THE INVENTION

1. Technical Field

This invention relates to heaters and, more particularly, to a microprocessor based controller for a diesel fuel fired heater.

2. Discussion

Diesel fuel fired heaters include air and coolant heaters using diesel fuel as their primary fuel supply. The diesel heaters provide an independent heat source for any system having diesel fuel and battery power available. Diesel heaters have been utilized in many varied areas such as auxiliary heat in a treatment area of an ambulance, replacement of engine idling as a primary heat source for an engine and a cab of a diesel truck during layovers, deliveries, breaks, etc.

Use of the diesel heaters is expected to increase as the EPA enacts more stringent requirements for diesel engine emissions and fuel efficiency and as the cost of fuel increases. Under these future conditions, truck drivers will be less inclined to leave their engines idling during breaks, layovers, and deliveries while still requiring cab and engine heat. Furthermore, the EPA requirements will lead to the introduction of new and more efficient engines which typically produce less heat that can be transferred for use in other areas.

Existing controllers for diesel fuel fired heaters lack many desirable and necessary features. While existing controllers have timers for automatic starting, they lack automatic starting based on coolant temperature. Some controllers indicate failures encountered during use through a sequence of flashing lights which are not stored for later retrieval. Service personnel may not be present when the sequence of flashing lights occur. In addition, prior failures can provide clues as to causes of later failures.

In summary, more sophisticated controlling techniques for the diesel heaters are desirable.

SUMMARY OF THE INVENTION

A diesel heater includes a combustion chamber and a fuel pump for pumping diesel fuel to the combustion chamber. An air supply device supplies combustion air to the combustion chamber. An igniter ignites the diesel fuel to generate combustion heat. A heat exchange fluid supplying device supplies fluid in heat exchange relationship with the combustion heat. A thermal sensor in contact with the heat exchange fluid generates a temperature signal related to the temperature of the heat exchange fluid. A flame detector detects an ignited diesel fuel flame and generates a flame signal in response thereto. A microprocessor includes a memory and a plurality of input/output ports wherein the input/output ports are electrically connected to the thermal sensor, the fuel pump, the heat transfer fluid supplying device, the igniter, the combustion air supply device, and the flame detector. The memory stores a normal operating sequence, a start-up sequence, and a fail start period for the start-up sequence. An input device allows the current day and current time to be entered into the microprocessor memory. The microprocessor thereafter updates the current day and current time. A lower threshold temperature for the heat exchange fluid can be entered into the microprocessor memory by the input device. A start day and start time can also be entered into the microprocessor memory by the input device. The microprocessor automatically initiates the start-up sequence when the heat transfer fluid falls below the lower threshold temperature or when the current day and the current time equal the start day and the start time. The microprocessor executes the normal operating sequence when the flame signal is received.

In another feature of the invention, the microprocessor activates the heat exchange fluid supplying device for a first period when the fluid falls below the low temperature setpoint before initiating the start-up sequence to ensure uniform temperature of the fluid in the heat exchanger and a coolant system attached thereto. The microprocessor initiates the start-up sequence if the coolant temperature is below the low temperature setpoint after the heat exchange fluid supplying device was activated for the first period.

In still another feature of the invention, a microprocessor memory stores a purge sequence. The microprocessor executes the purge sequence when the microprocessor detects a voltage input from a voltage supply less than an operating voltage threshold during the normal operating sequence.

In yet another feature of the invention, a passenger cab temperature sensing device senses temperature in a passenger cab. A cab heating device is connected to the heat exchange fluid supplying device and actuates a fan to direct air into heat exchange relationship with the heated fluid from the heat exchange fluid supplying device. An input device sets a cab temperature setpoint in the microprocessor memory. The microprocessor is connected to the cab temperature sensor and the cab heater. The microprocessor actuates the cab heater during the normal operating mode to maintain the cab temperature at the cab temperature setpoint.

Other objects, features and advantages will be readily apparent.

BRIEF DESCRIPTION OF THE DRAWINGS

The various advantages of the present invention will become apparent to those skilled in the art after studying the following specification and by reference to the drawings in which:

FIG. 2 is a functional block diagram of a diesel heater;

FIG. 3A is a schematic diagram of a low pressure fuel supply system;

FIG. 3B is a schematic diagram of a high pressure fuel supply system;

FIG. 3C is a schematic diagram of a resistance ignition system;

FIG. 3D is a schematic diagram of an electric arc ignition system;

DESCRIPTION OF THE PREFERRED EMBODIMENT

Figure 1A:
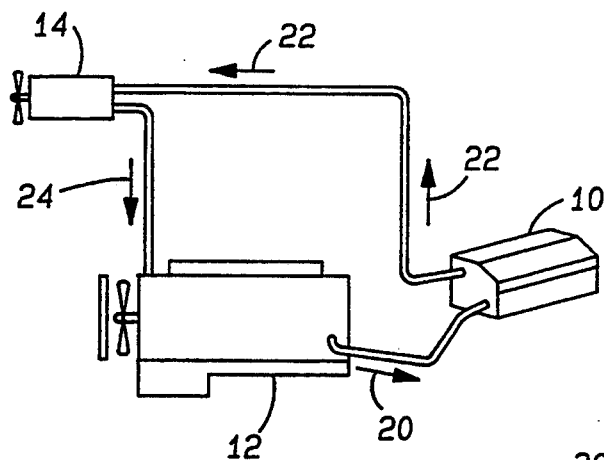
FIGS. 1A–1D are schematics of a diesel heater connected to a heater core and an engine.

In FIGS. 1A–D, several typical coolant connections are shown for a diesel heater 10. In FIG. 1A, the diesel heater 10 is connected in series to an in-line engine 12 and a heater core 14. The diesel heater 10 can be a SureHeat® diesel heater manufactured by Phillips Temro. Coolant is circulated from the engine 12 in a direction indicated by arrow 20 to the diesel heater 10 and heated therein. Heated coolant is pumped out of the diesel heater 10 in a direction of arrows 22 into the heater core 14. Coolant then returns to the engine 12 in a direction of arrow 24. As such, coolant in the engine can be heated with the engine off. Additionally, the coolant can be used to heat the heater core 14 which can be used to heat a truck's cabin, a treatment area in an ambulance, etc.

Figure 1B:
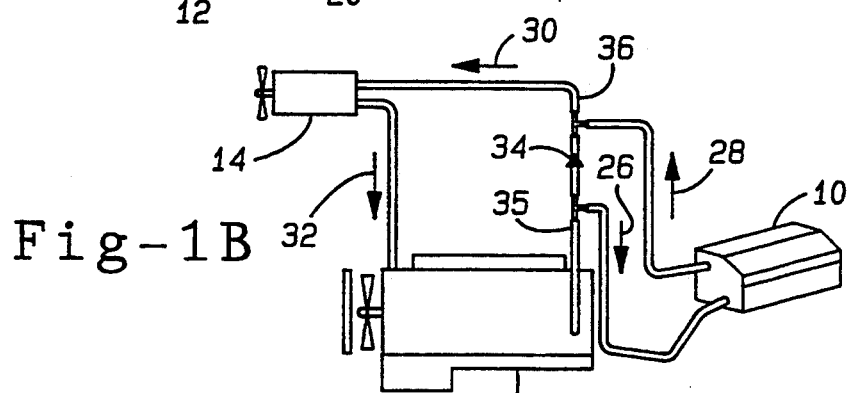

In FIG. 1B, the diesel heater 10 is connected in parallel to the in-line engine 12 and the heater core 14. Coolant follows a circular path defined by arrows 26, 28, 30, 32. A check valve 34 is typically located between line 35 and line 36.

Figure 1C:
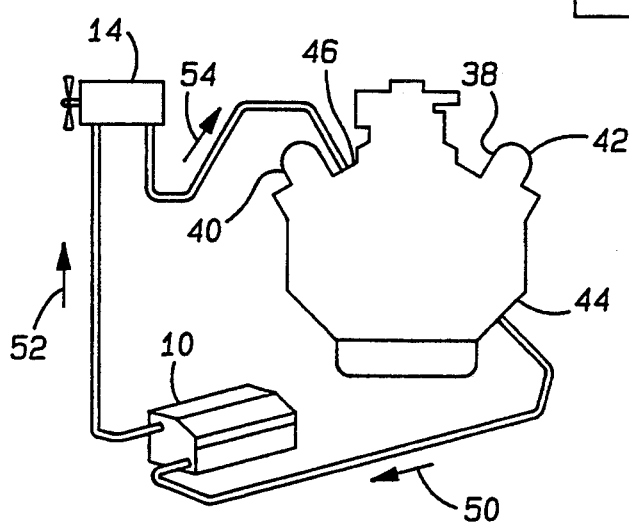

In FIG. 1C, the diesel heater 10 is connected in series to a V engine 38 and the heater core 14. Since most V engines share a common coolant chamber for first and second banks 40 and 42, coolant is drawn from a lower portion 44 of the second bank 42 and returned to an upper portion 46 of the first bank 40. Coolant follows a path defined by arrows 50, 52, 54.

Figure 1D:
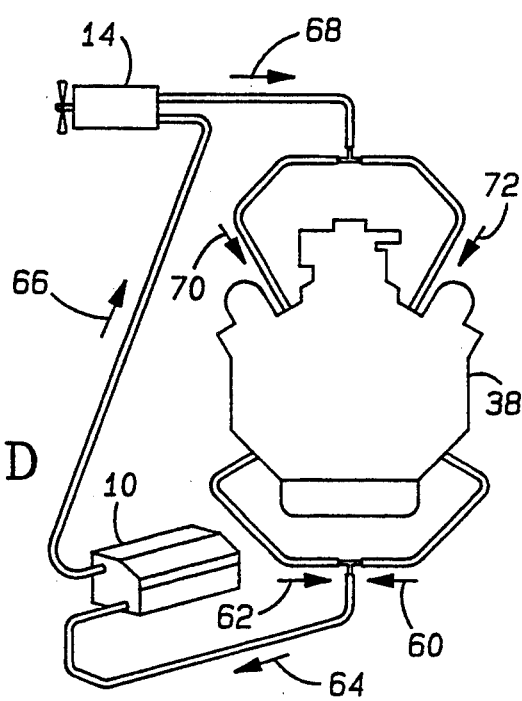

In FIG. 1D, the diesel heater 10 is connected in parallel to the V engine 38 and the heater core 14. Coolant follows a path defined by arrows 60 and 62, 64, 66, 68, and 70 and 72. Other coolant connections and uses of the diesel heater with other types of engines will be readily apparent.

In FIG. 2, the basic components of diesel heater 10 are shown as including an ignition system 74, a fuel system 76 with a fuel supply 78 and a fuel pump 79, a combustion air system 80 with a fan 82 and a combustion air supply 83, a coolant system 84 with a fluid supply 85 and a fluid pump 86, a heat exchanger 88, and a temperature sensor 92 located in the fluid. The fluid supply 85 delivers air or liquid coolant.

The ignition system 74 ignites fuel supplied by the fuel pump 79 and the fuel supply 78 in a combustion chamber (see FIGS. 3C and 3D). The fan 82 pressurizes air from the supply 83 for combustion with the fuel in the combustion chamber. Heated combustion air circulated through the heat exchanger heats a fluid supplied by the pump 86 from a secondary system or fluid supply 85. The heat exchanger 88 can be an air-to-liquid or air-to-air heat exchanger. For example, FIGS. 1A–1D typically use liquid coolant and therefore an air-to-liquid heat exchanger is used. A temperature sensor 92 indicates the temperature of the fluid.

Generally, diesel fuel fired heaters 10 use two types of fuel systems 76: low pressure and high pressure. A low pressure fuel system 100 (FIG. 3A) includes a fuel pick-up tube 102, an inlet fuel line 104, a solenoid pump 106, and a fuel outlet 108. The solenoid pump 106 draws fuel from the fuel supply 96 into the inlet fuel line 104 and delivers fuel to the fuel outlet 108.

A high pressure fuel system 110 in FIG. 3B includes a fuel pick-up tube 114, a fuel return 118, an inlet fuel line 116, a fuel filter 120, a fuel pump 122, a pressure regulator/bypass 124, a control solenoid 126, and a nozzle 128. The fuel pump 122 draws fuel into the fuel pick-up tube 114 and the inlet fuel line 116 through the fuel filter 120 which removes particulate in the fuel. The control solenoid 126 pulses fuel pressurized by the pump 122 into the nozzle 128. The fuel regulator/bypass directs excess fuel back to the fuel supply 96 via the fuel return line 118. Other types of fuel systems will be readily apparent.

The ignition system 80 can be a resistance system 130 in FIG. 3C or electrical arc system 134 in FIG. 3D. The resistance ignition system 130 is typically used with the low pressure fuel system 100 and includes a controller 136 and a burner assembly 138 with a glow plug 140 and with the fuel outlet 108. The controller 136 passes system voltage to the glow plug 140 which ignites fuel in a combustion chamber 139 supplied at the fuel outlet 108.

The electrical arc system 134 is typically used with the high pressure fuel system 110 and includes a controller 142, an ignition coil 144, and a burner assembly with an electrode holder 148, the fuel nozzle 128, and ignition electrodes 150. The controller 142 powers the ignition coil 144 which generates a high voltage across the ignition electrodes 150 to ignite fuel delivered by the nozzle 128 in a combustion chamber 151.

Figure 4:
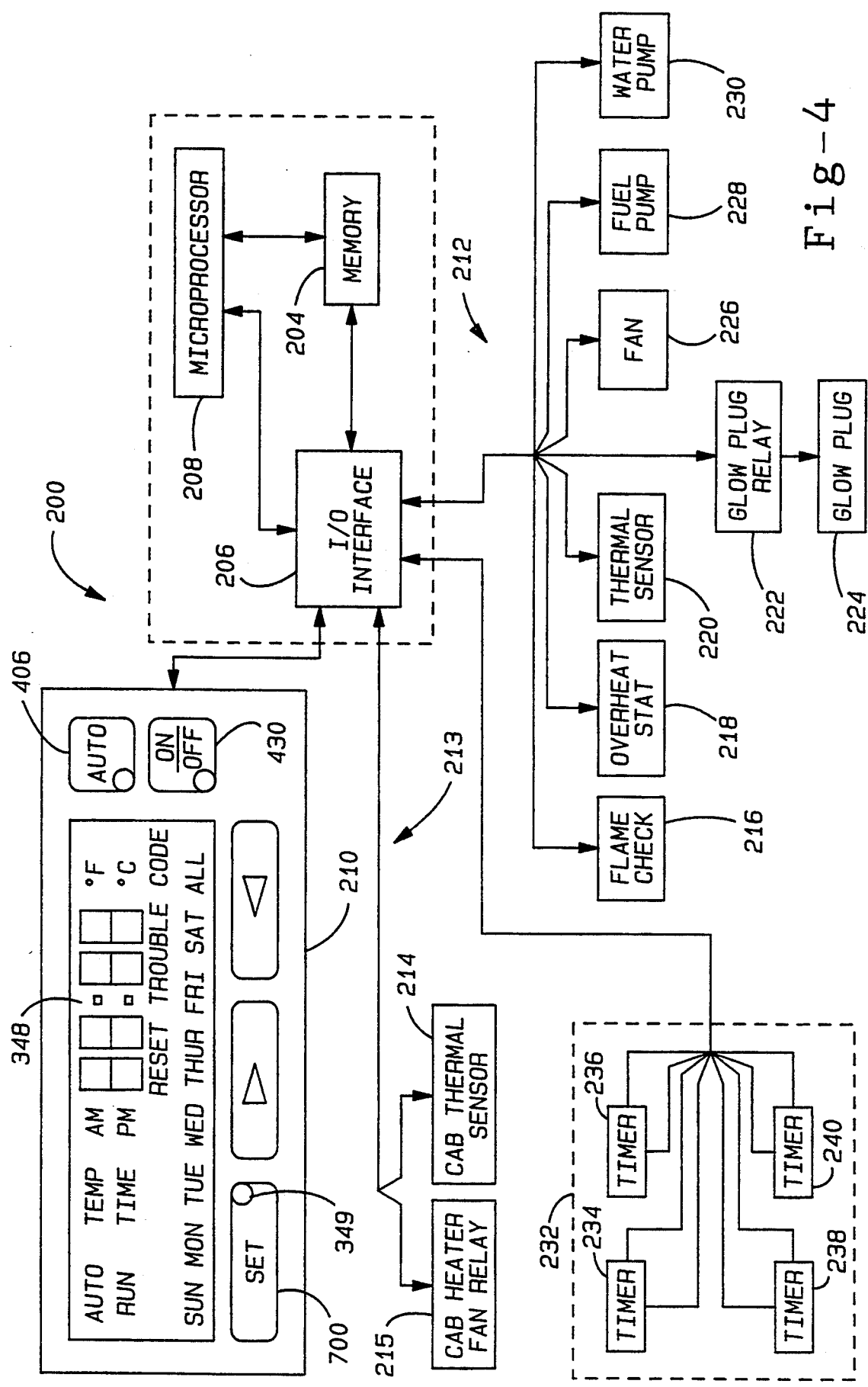
FIG. 4 is a functional block diagram of a system controller for a diesel heater.
Figure 5:
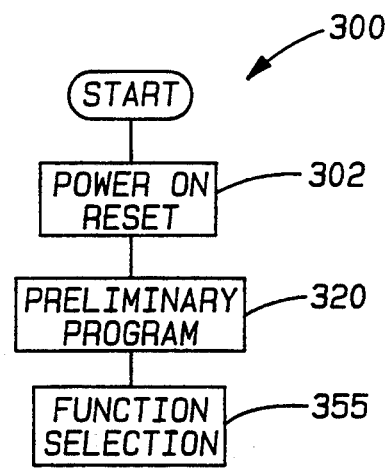
FIG. 5 is a logic diagram of a power-on routine.

In FIG. 4, a controller 200 according to the present invention is shown. The controller 200 includes memory 204 (ROM, RAM, etc.), an I/O interface 206, and microprocessor 208. A control algorithm located in the memory 204 is executed by the microprocessor 208 and controls and interacts with a plurality of devices connected to the I/O interface 206.

A control panel 210 allows a user to program the controller 200 as will be described in detail below. The I/O interface 206 is connected to a first I/O group 212 associated with the diesel fuel fired heater 10. The I/O interface 206 can also be connected to a second I/O group 213 associated with an environment to be controlled, for example a cab of a truck, however the second I/O group 213 is optional as will be described below. The second U/O group can include a cab thermal sensor 214 and a cab heater tan relay 215.

The first I/O group 212 includes a flame check sensor 216, an overheat thermostat 218, a thermal sensor 220, a glow plug relay 222 (and a glow plug 224), a combustion air fan 226, a fuel pump 228, and a water pump 230. The flame check sensor 216 can be an optical sensor, for example a photodiode, placed in close proximity to the glow plug 224.

A timing device 232 can include a plurality of timers 234, 236, 238 and 240 for timing various startup, shutdown or other operations as will be described further below. While timers 234, 236, 238 and 240 are shown in FIG. 4, such timing can be performed by microprocessor 208 and memory 204 under control of a suitable software program stored in memory 204. Other timing methods will be readily apparent.

Figure 6:
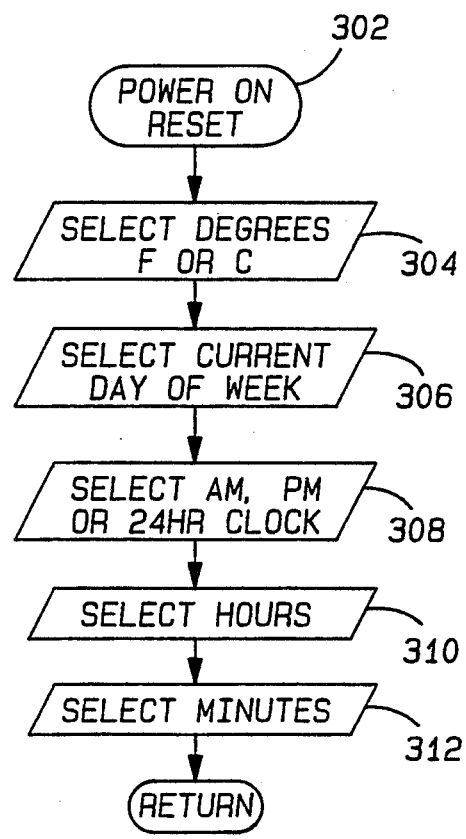
FIG. 6 is a logic diagram of a power-on reset routine.

FIGS. 5–15 show logic diagrams of multiple routines of an operating program stored in the memory 204 and executed by the microprocessor 208. When power is initially connected or reconnected to the microprocessor 208, the microprocessor executes a self-diagnostic routine (not shown) which tests circuit components thereof. Upon completing the self-diagnostic routine, the microprocessor 208 runs a power-on routine 300 (FIG. 5) including a power-on reset routine 302 (FIG. 6). The power-on reset routine 302 requires a user to input degrees Fahrenheit or Centigrade, and set the day and date, as seen in blocks 304-312. Once the power-on reset routine 302 is complete, the microprocessor 208 is ready for a programming routine 320 (FIG. 7A) or a function selection routine (described below). The programming routine 320 allows a user to:
1. Program automatic time setpoint or automatic temperature setpoint in blocks 322-330;
2. program an operating temperature setpoint in block 330-332;
3. program current day and time in blocks 334-336;
4. program run time (time until turn-off) in blocks 338-340; or
5. view trouble codes in blocks 344-346.

Figure 7B:
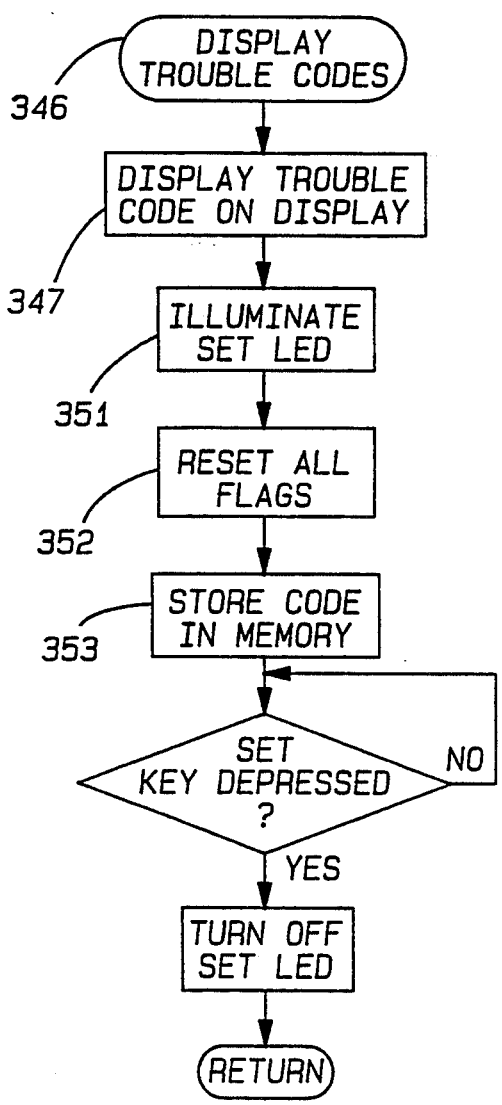
FIG. 7B is a logic diagram of a display trouble codes routine.
Figure 7A:
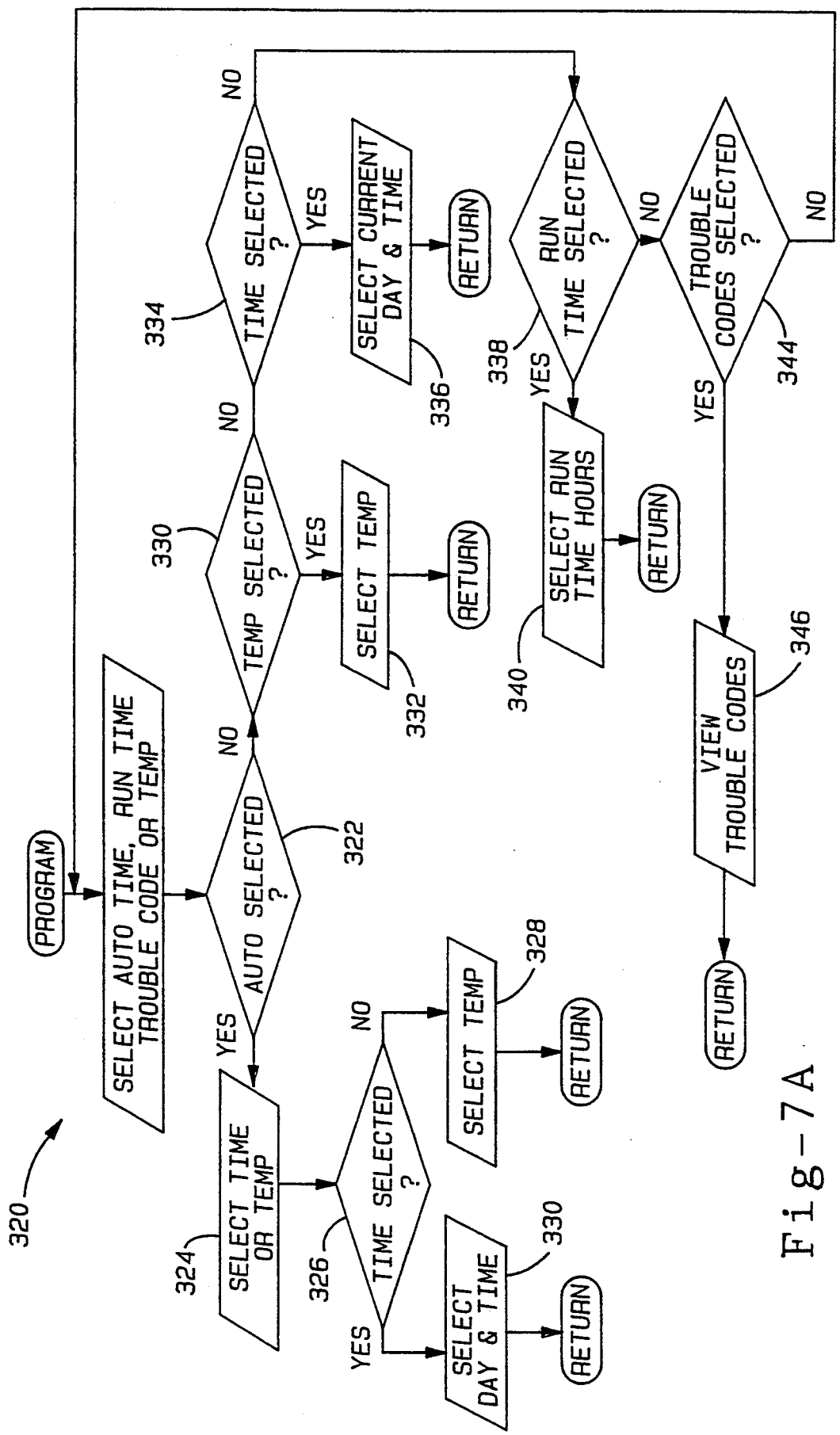
FIG. 7A is a logic diagram of a programming routine.
Figure 8:
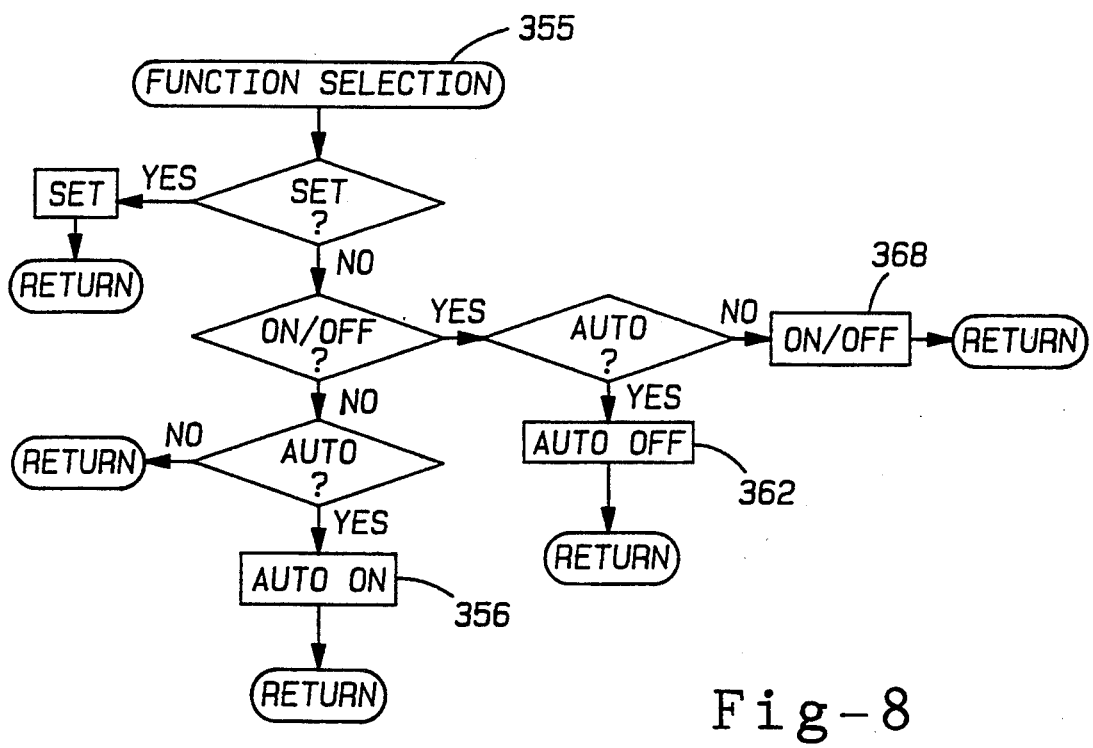
FIG. 8 is a logic diagram of a function selection routine.

The block 346 executes a display trouble codes routine shown in FIG. 7B. In block 347, a trouble code is displayed on a display 348 of the control panel 210. A set LED 349 adjacent a set key 350 is illuminated in block 351. All flags are reset in block 352. The trouble code is stored in the memory 204 in block 353. If the set key 350 is pressed, as determined in block 354, the set LED 349 is turned off and the display 348 stops displaying the trouble code.

Figure 10:
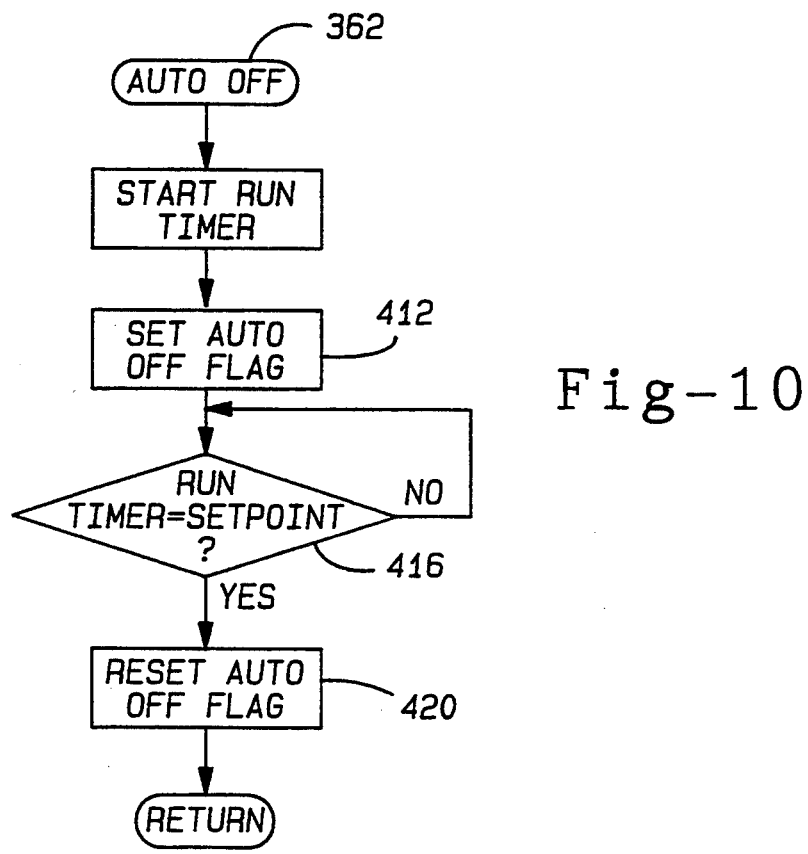
FIG. 10 is a logic diagram of an auto off routine.
Figure 11:
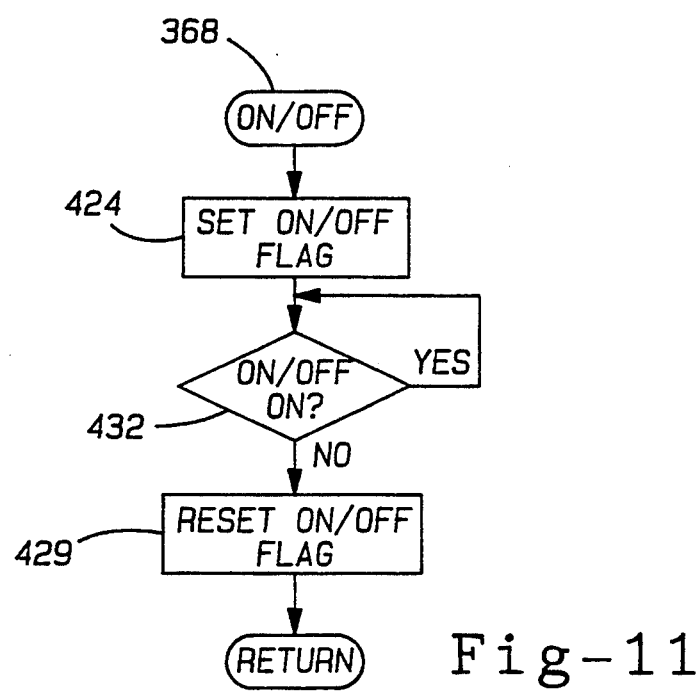
FIG. 11 is a logic diagram of an on/off routine.

If a function selection routine 355 (FIG. 8) is selected, a user can select an auto on routine 356 (FIG. 9), an auto off routine 362 (FIG. 10), or an on/off routine 368 (FIG. 11).

Figure 9:
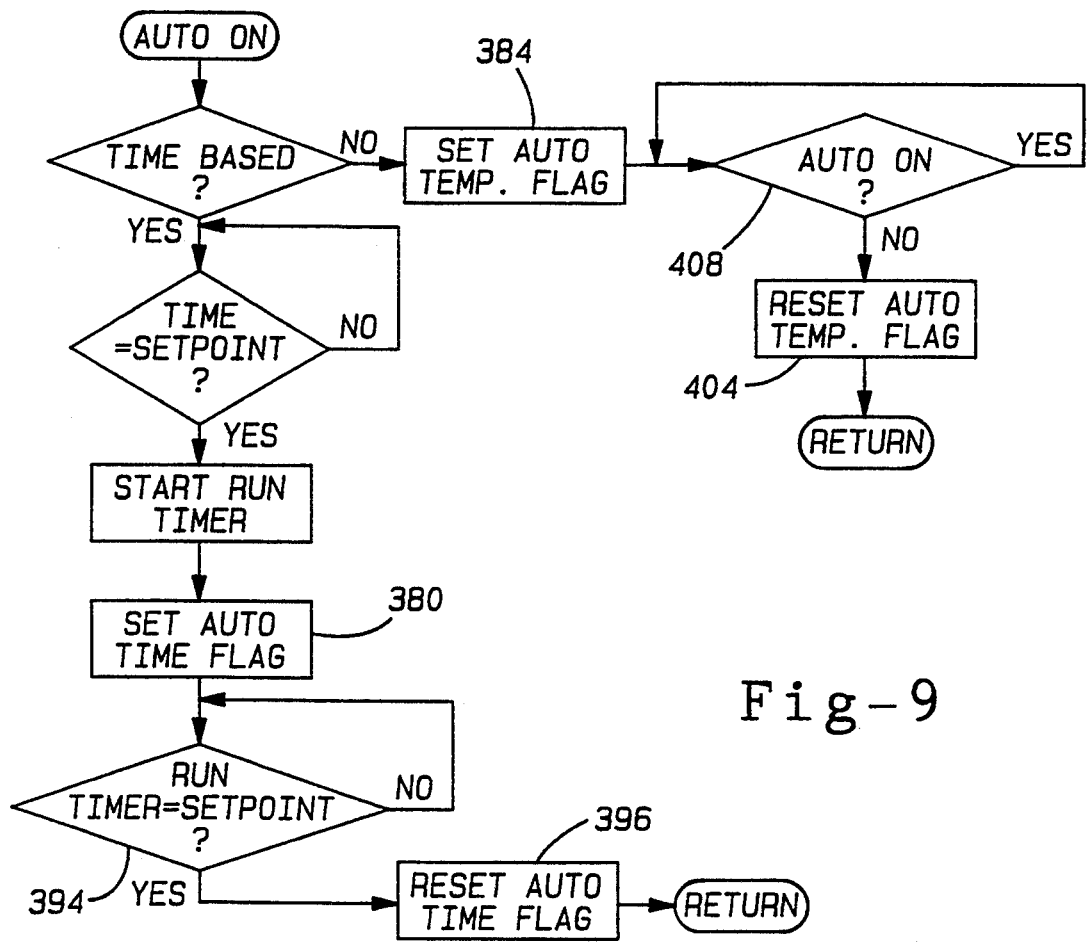
FIG. 9 is a logic diagram of an auto on routine.

The auto on routine 356 in FIG. 9 sets either an auto time flag in block 380 or an auto temp flag in block 384 depending upon which type of auto operation was selected in the programming routine 320. If the auto time flag is set by block 380, a main routine 390 (FIG. 12) executes additional trouble code diagnostics (described below) in dotted lines 391. If no trouble codes are detected, the main routine 390 executes a normal operation routine 392 (FIGS. 13A and 13B) until the auto time flag is reset as determined in block: 393. The auto time flag is reset when a run timer in block 394 (FIG. 9) reaches the time setpoint and resets the auto time flag in block 396.

If the auto temp flag is set by block 384, the main routine 390 executes additional trouble code diagnostics (described below) in dotted lines 391. If no trouble codes are detected, the main routine 390 executes the normal operation routine 392 if the thermal sensor 220 detects coolant temperature less than the temperature setpoint as determined in block 400 or until the auto temp flag is reset as determined in block 402. The auto temp flag is reset by block 404 (FIG. 9) when an auto button 406 on the control panel 210 is turned off as determined in block 408.

The auto off routine 362 in FIG. 10 sets an auto off flag in block 412 and runs a timer until a timer setpoint is reached as determined in block 416. The timer setpoint is set in the block 340 of FIG. 7. While the auto off flag is set, the main routine 390 (FIG. 12) executes additional trouble code diagnostics (described below) in dotted lines 391. If no trouble codes are detected, the main routine 390 executes the normal operation routine 390 until the auto off flag is reset as determined in block 418. The auto off flag is reset in block 420 (FIG. 10) when the timer setpoint is reached in the block 416.

Figure 12:
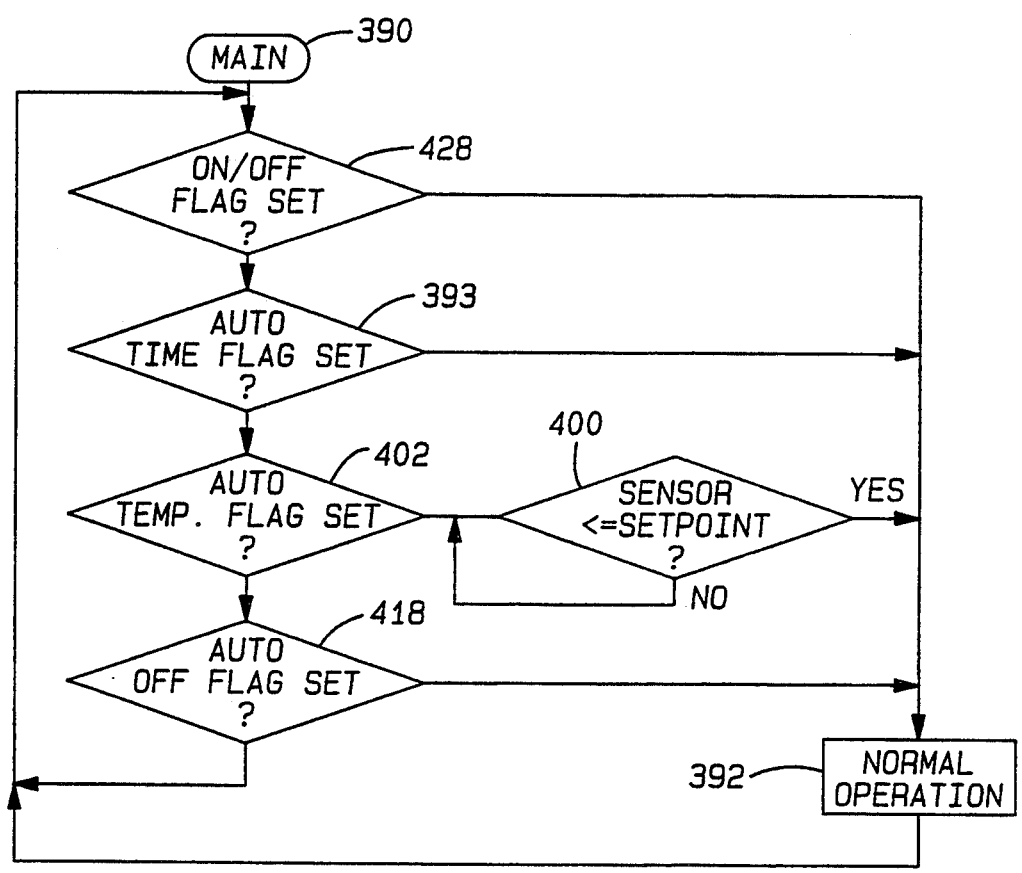
FIG. 12 is a logic diagram of a main routine.

The on/off routine 368 in FIG. 11 sets an on/off flag in block 424. The main routine 390 executes additional trouble code diagnostics (described below) in dotted lines 391. If no trouble codes are detected, the main routine 390 executes the normal operation routine 392 until the on/off flag is reset as determined in block 428 (FIG. 12). The on/off flag is reset by block 429 (FIG. 11) when an on/off button 430 on the control panel 210 is pushed as determined in block 432.

The additional trouble code diagnostics in dotted lines 391 determine if a fuse circuit is open in block 440 by monitoring current flowing therethrough. The additional trouble code diagnostic routine is loaded in the memory 204 of the controller 200. If the fuse circuit is not open, the controller 200 determines whether a fan circuit powering the fan 226 is open by monitoring current flowing therethrough (block 442). If the fan circuit is not open, the controller 200 determines whether a water pump circuit powering the water pump 218 is open by monitoring current flowing therethrough (block 446). If the water pump circuit is not open, the controller 200 determines if there is a short in a circuit powering the microprocessor 208 (block 448). If the controller 200 does not sense a microprocessor short circuit, operation continues with the normal operating routine 392.

If the controller 200 determines that the fuse circuit is open in block 440, the purge cycle is executed in the block 450 and a trouble code 00F is output to the display 348 in block 452. If the controller 20.0 determines that the fan circuit is open in the block 442, the purge cycle is executed in block 456 and a trouble code 007 is output to the display 348 in block 458. If the controller 200 determines that the water pump circuit is open in the block 446, the purge cycle is executed in block 462 and a trouble code 009 is output to the display 348 in block 464. If the controller 200 determines that the microprocessor circuit is shorted in the block 448, the purge cycle is executed in block 470 and a trouble code 008 is output to the display 348 in block 474.

Figure 13A:
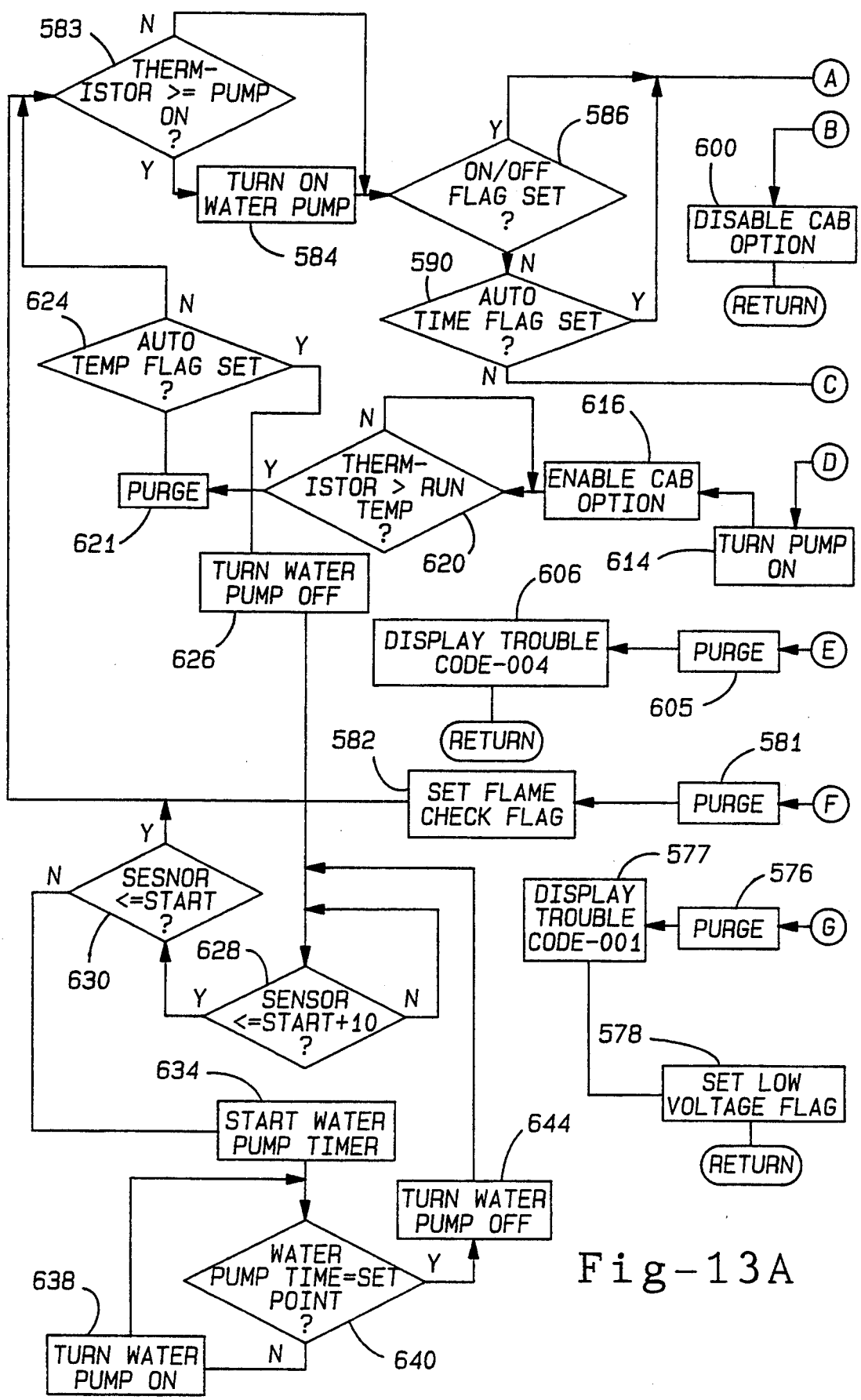
FIGS. 13A–13C are logic diagrams of a normal operation routine.
Figure 13B:
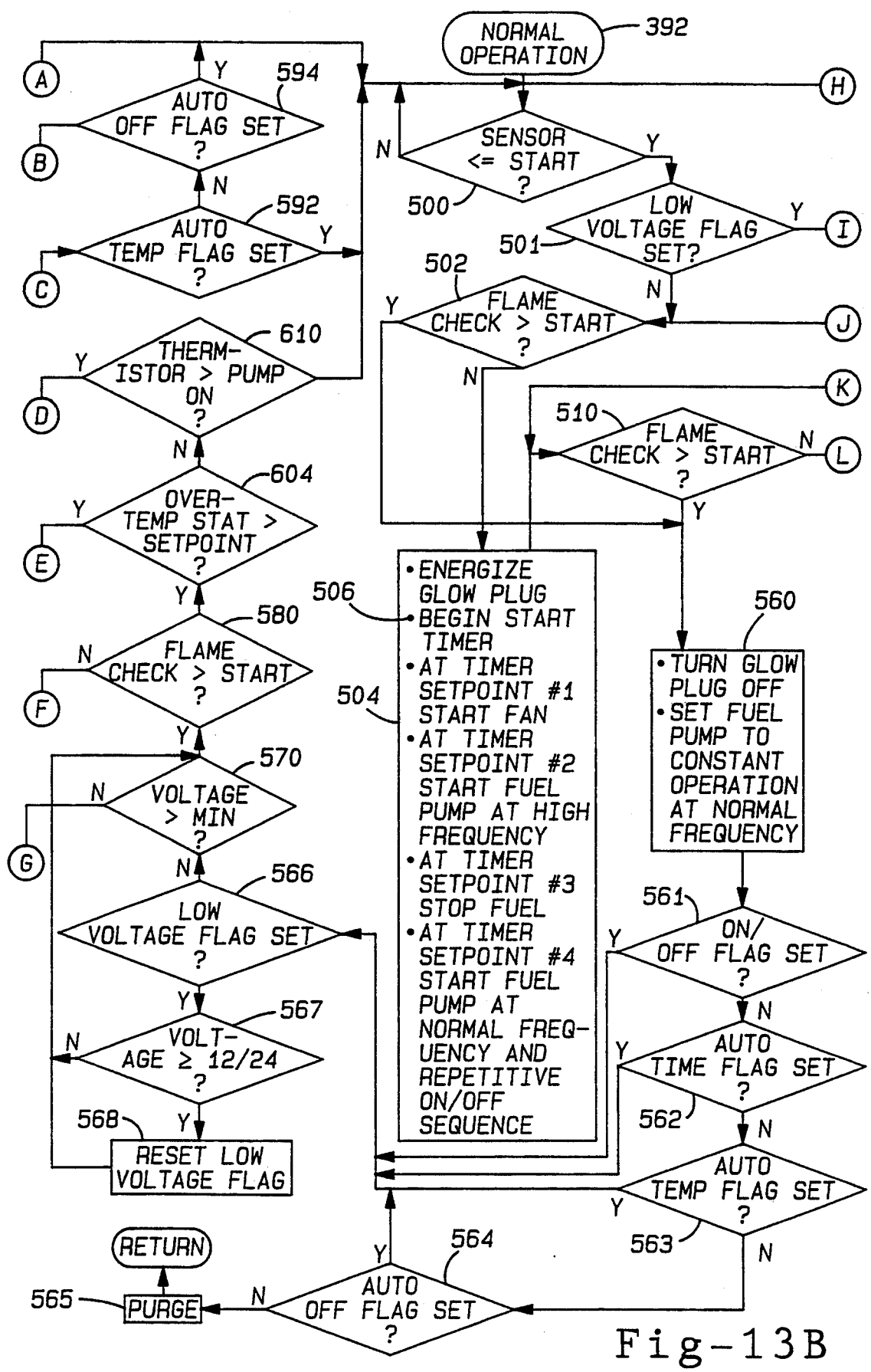

In FIGS. 13A and 13B, the normal operation routine 392 is shown in greater detail. If the thermal sensor 220 detects coolant temperature less than a start temperature (for example, 140° F. for the SureHeat ®, a default value, or the automatic temperature setpoint set in block 328 of the programming routine 302) as determined in block 500, if a low voltage flag has not been set as determined in block 501, and if the flame check sensor 216 does not detect a stable flame as determined in block 502, the following steps (block 504) are executed:
1. the glow plug 224 is energized by applying voltage to the glow plug relay 222 and a start timer at 506 is started;
2. at a first setpoint (for example 25 seconds for the SureHeat ®), the fan 226 is started;
3. at a second setpoint (for example 27 seconds for the SureHeat ®), the fuel pump 228 is started at a first frequency (for example 6 Hz);
4. at a third setpoint (for example 35 seconds for the SureHeat ®), a first timer (for example, a two second timer for the SureHeat ®) is started and the fuel pump 228 is shut off. When the first time resets the fuel pump 228 is reduced to a second frequency (for example 4 Hz), and a second timer is started (for example a five second timer);
5. when the second timer resets, the fuel pump 228 is stopped and a third timer is started (for example a two second timer for the SureHeat ®); and 6. when the third timer resets, the fuel pump 228 is restarted at the second frequency and the second timer is restarted.

Steps 5 and 6 are repeated until either the flame check sensor 216 detects a flame as determined in block 510 or the start timer in the block 504 reaches a failed start period (for example 150 seconds for the SureHeat ®) as determined in block 512.

If the start timer reaches the failed start period, a start counter is incremented in block 516 and the start operation is repeated. If the start counter is incremented to 2 as determined in block 518 and a flame check flag has not been set as determined in block 520, a purge cycle (FIG. 14) in block 521 is executed and a trouble code 002 is displayed in block 524. The trouble code is recorded in chronological order with respect to past trouble codes in the memory 204 for later retrieval when the display trouble code routine 364 (FIG. 7B) is executed. The trouble code 002 signifies a failed start.

If the start counter is incremented to 2 as determined in the block 518 and the flame check flag has been previously set as determined in the block 520, the purge cycle is executed in block 525 and a trouble code 003 is displayed (block 528). The trouble code is chronologically recorded in the memory 204 for later retrieval when the display trouble code routine 364 (FIG. 7B) is executed. The trouble code 003 signifies a loss of the combustion flame.

Figure 14:
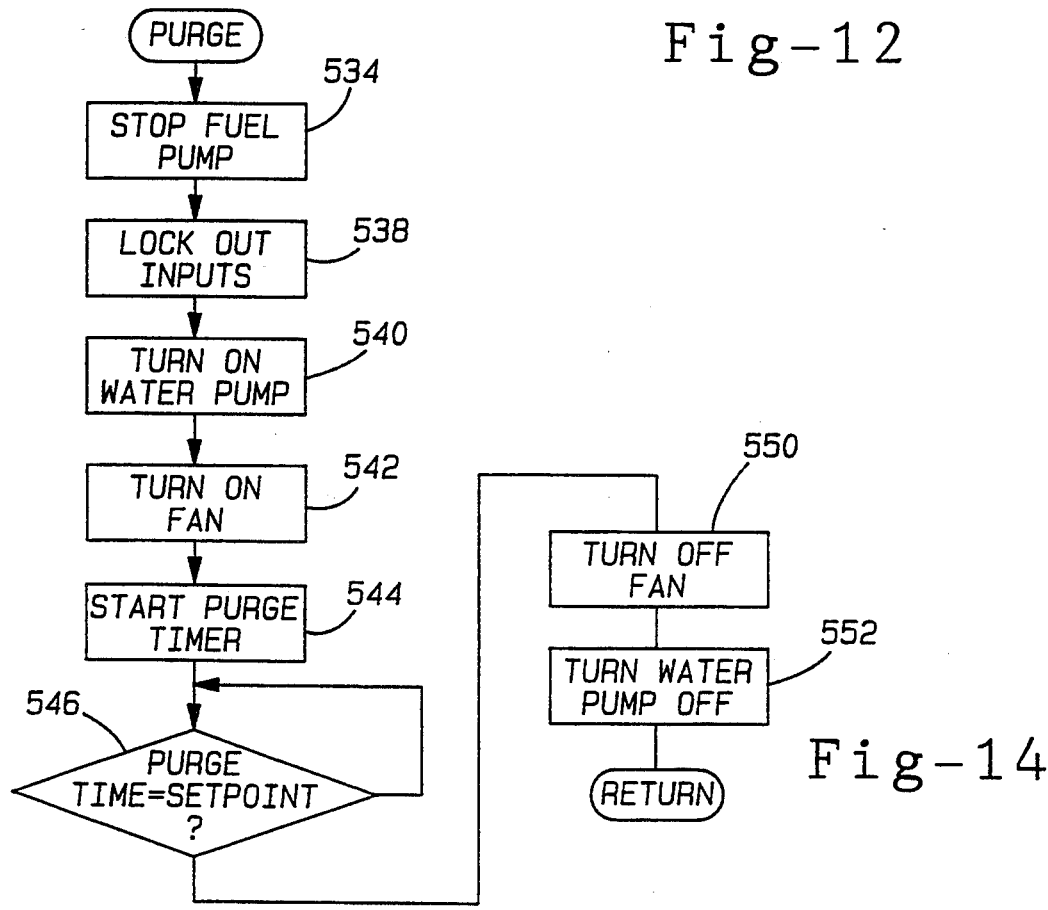
FIG. 14 is a logic diagram of a purge routine.

The purge cycle involves the following steps as shown in FIG. 14:

1. the fuel pump 228 is stopped in block 534;
2. inputs to the I/O interface 206 are locked out in block 538;
3. the water pump 230 is turned on in block 540;
4. the fan 226 is turned on in block 542;
5. a purge timer is started in block 544 and runs until a purge setpoint (for example, 120 seconds for the SureHeat ® diesel heater 10) is reached as determined in block 546:
6. the fan 226 is turned off in block 550; and
7. the water pump is turned off in block 552.

If the flame check sensor 216 detects the flame as determined in the block 510, the glow plug 224 is turned off in block 560 and the fuel pump 228 is operated continuously at the second frequency (4 Hz for the SureHeat ®).

After operation (originally initiated by setting the on/off flag, the auto time flag, the auto temp flag, or the auto off flag), if the same flag is later reset (e.g. if the on/off flag: has been reset as determined in block 561, if the auto time flag has been reset as determined in block 562, if the auto temp flag has been reset as determined in block 563, or if the auto off flag has been reset as determined in block 564), the purge cycle is executed in block 565.

Otherwise, operation proceeds to block 566 which determines whether the low voltage flag has been set. If the low voltage flag has been set, the input voltage to the microprocessor 208 is continually checked. If the input voltage is greater than a normal operating voltage (12 VDC or 24 VDC for the SureHeat ®) as determined in block 567, then the low voltage flag is reset in block 568.

If the low voltage flag has not been previously set, the input voltage is checked in block 570. If block 570 determines that insufficient input voltage is present, then the purge cycle is executed in block 576 and a trouble code 001 is displayed on the control panel 210 as shown in block 577 and the low voltage flag is set in block 578. The trouble code is chronologically recorded in the memory 204 when the display trouble code routine (FIG. 7B) 364 is executed.

For example, the SureHeat ® diesel heater 10 has an insufficient input voltage setpoint of 10.5 VDC for 12 VDC systems and 21.5 VDC for 24 VDC systems.

If sufficient input voltage is present as determined in the block 570, the flame check sensor 216 determines if a flame is present in block 580. If the flame check sensor 216 does not sense a flame, the purge cycle is executed in block 581 and the flame check flag is set in block 582. Then block 583 determines whether coolant temperature is greater than or equal to a pump on temperature (for example 110° F. for the SureHeat ®). If the coolant is greater than or equal to the pump on temperature, the water pump 230 is turned on in block 584.

If the on/off flag is set as determined in block 586, or if the auto time flag is set as determined in block 590, or if the auto temp flag is set as determined in block 592, or if the auto off flag has been set as determined in block 594, then operation continues with block 500. If none of the flags have been set in the blocks 586-594, then cab options are disabled in block 600 and the normal operation routine 392 ceases.

If the overheat thermostat detects an overheat temperature (for example 210° F. for the SureHeat ®), the purge cycle is executed in block 605 and a trouble code 004 is displayed in block 606. The trouble code 004 is chronologically recorded in the memory 204 when the display trouble code routine 364 (FIG. 7B) is executed.

The water pump 230 is automatically turned on when the coolant sensor measures coolant temperature above the pump on temperature as determined in block 610. If the coolant temperature is not above the pump on temperature, operation continues at block 500. If the coolant temperature is above the pump on temperature, the water pump 230 is turned on in block 614 and cab options are enabled in block 616.

Operation continues until the coolant reaches a run temperature (for example 190° F. for the SureHeat ®) as determined in block 620 after which the purge cycle occurs in block 621. If the auto temp flag has been set as determined in block 624, the water pump 230 is turned off in block 626. Operation is in a standby mode until the thermal sensor 220 measures a coolant temperature less than the start temperature (in this case the auto temp setpoint previously set during the programming routine 320) plus 10° F., as determined in block 628.

If the coolant temperature measured by the thermal sensor in block 630 is greater than the start temperature, a water pump timer is started in block 634 and the water pump 230 is turned on (block 638) until the water pump timer setpoint is reached as determined in block 640. The water pump 230 is then turned off in block 644 and operation continues with the block 628.

If the thermal sensor 220 senses coolant temperature below the start temperature in the block 630, operation continues with the block 583 as described above.

If the auto temp flag is not set as determined in the block 624, then operation continues with block 583 described above.

Figure 13C:
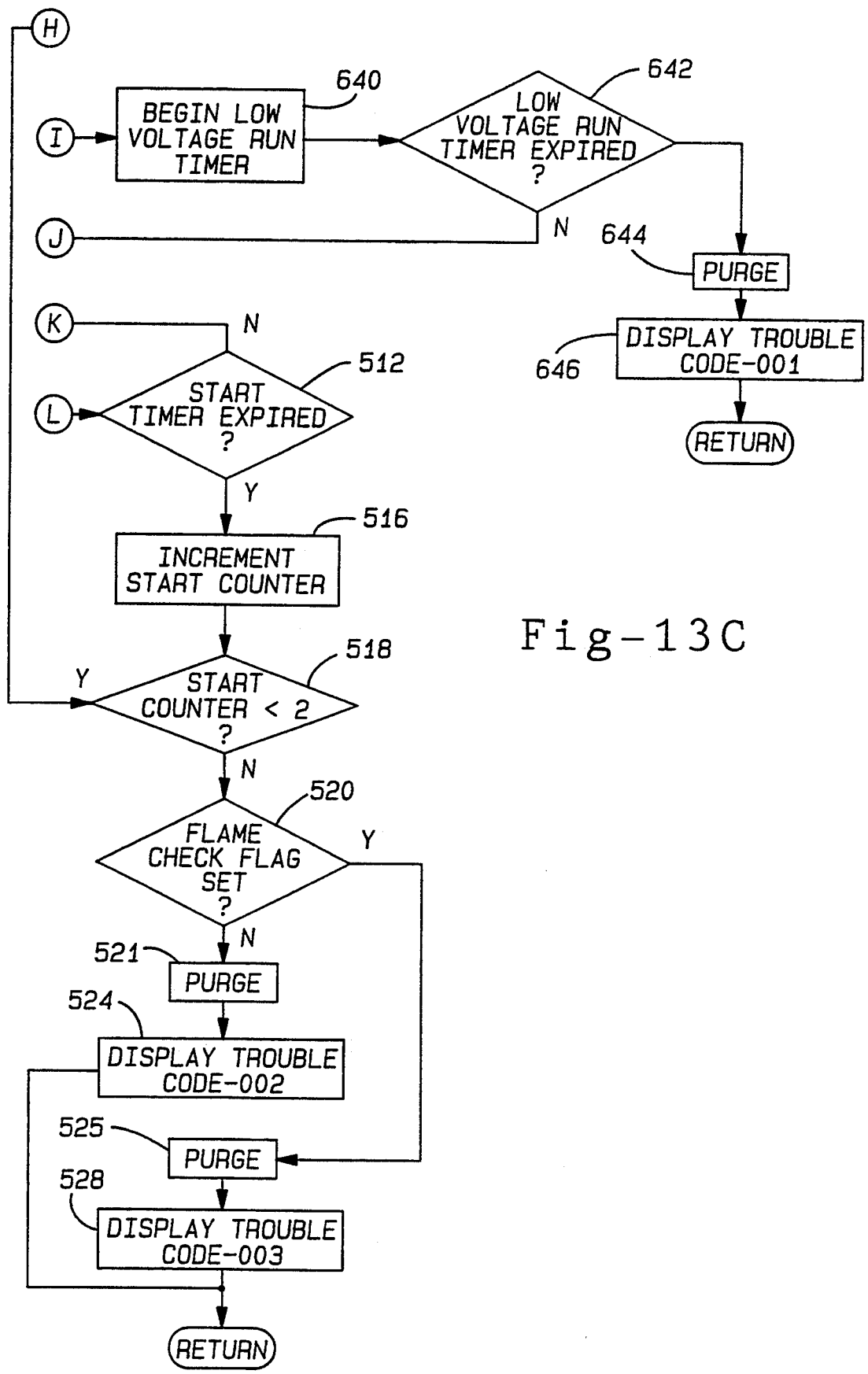

If the low voltage flag has previously been set in the block 578 as determined in the block 501, a low voltage run timer is started in block 640 (FIG. 13C). If the low voltage run timer has expired as determined in block 642, then the purge cycle is executed in the block 644 and the trouble code 001 is displayed in block 646.

Figure 15:
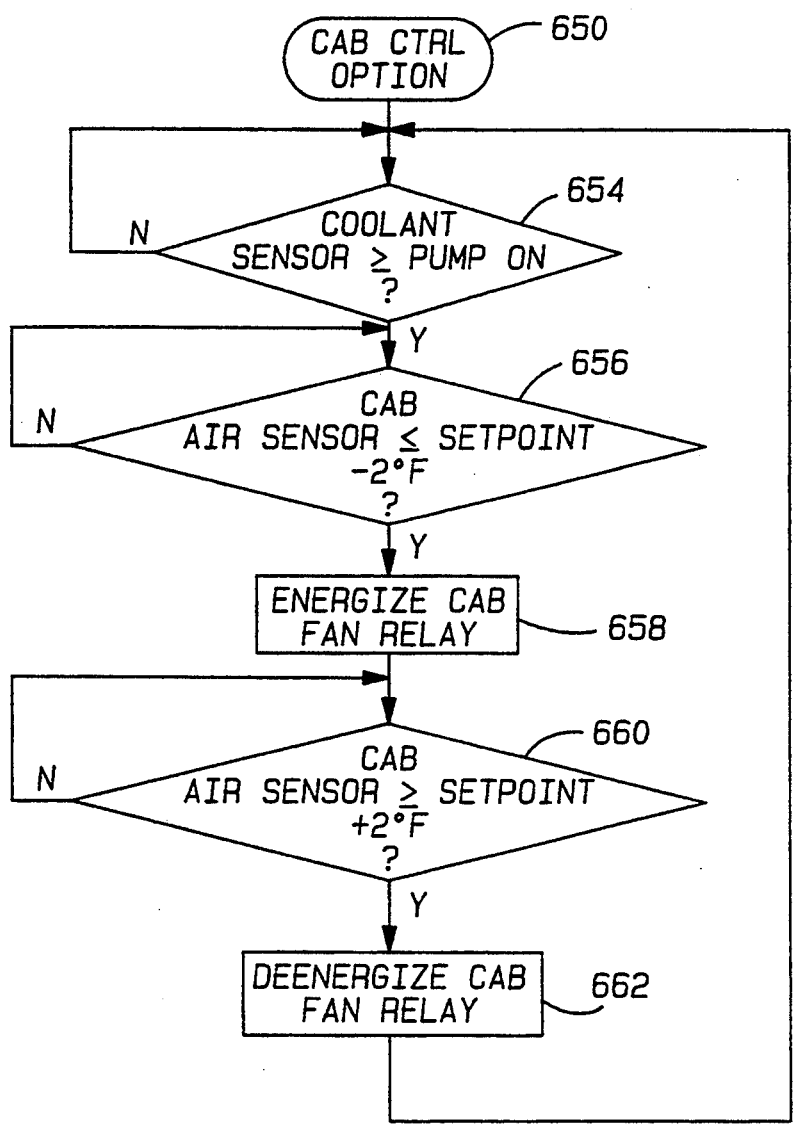
FIG. 15 is a logic diagram of a cab control option routine.

In FIG. 15, a cab control option routine 650 is shown. The cab control option routine 650 is enable by the block 616 and disabled by the block 600. Once enabled, the cab control option routine 650 determines if the thermal sensor 220 senses a coolant temperature above the pump on temperature as determined in block 654. If the coolant temperature is above the pump-on temperature, the cab control routine determines if the cab thermal sensor senses a cab temperature less than or equal to a cab setpoint minus 2° F. (block 656). If the cab temperature is less than or equal to the cab setpoint minus 2° F., the cab heater fan relay 215 is energized in block 658 and remains energized until the cab temperature is greater than or equal to the cab setpoint plus 2° F. as determined in block 660. The cab heater fan relay is deenergized in block 662.

As can be appreciated from the above description of the logic diagrams in FIGS. 5–15, the microprocessor 208 allows a user to program and control the diesel heater 10. When initially connected or reconnected to power, the microprocessor 208 goes through the self-diagnostics program and tests components thereof. Upon completing the self-diagnostics program, the microprocessor 208 executes the power-on routine 300 including the power-on reset routine 302, the programming routine 320 and the function selection routine 355.

The programming routine 320 allows a user to input setpoints, operating temperatures current day and time, run time, and view trouble codes, as described above. The function selection routine 355 allows the user to select on/off operation, auto on operation or auto off operation. The microprocessor 208 automatically executes a normal operation routine 392 including a start sequence in the block 504 when a user makes a call for heat. The call for heat can be made by pressing the on/off button 430, the auto button 406 or both.

The normal operating routine 392 is executed while the diesel heater 10 is in a steady state of operation. The steady state of operation is determined by a flame signal from the flame check sensor 216. While in the steady state, the fuel pump 228 continuously operates at the second frequency (4 Hz for the SureHeat ®), the fan 216 is on continuously, the water pump 230 is energized at the pump on temperature (110° F./43° C. for the SureHeat ®) and de-energized at a pump off temperature (100° F./38° C. for the SureHeat ®). The flame signal from the flame check sensor 216 and the thermal sensor 220 are continuously monitored. If the coolant temperature sensed by the thermal sensor 220 exceeds the run temperature (190° F./88° C. for the SureHeat ®), the microprocessor stops the fuel pump 228 causing combustion to cease. When the flame check sensor 216 stops generating the flame signal, the purge cycle begins. When the coolant temperature as measured by the thermal sensor 220 reaches the start temperature (130° F./55° C. for the SureHeat ®), the microprocessor 208 automatically restarts combustion. The microprocessor 208 continues until the thermal sensor 220 senses coolant temperature exceeding the run temperature. The microprocessor then repeats the above operation until user shut down or system failure.

If during operation of the diesel heater 10, the overheat thermostat 218 senses the overheat temperature (210° F. for the SureHeat ®) and opens, power is cut to the fuel pump 228, an overheat signal is output to the controller 200. Upon receiving the overheat signal, the controller 200 initiates the purge cycle. When the purge cycle is completed, the controller 200 outputs a trouble code 004 to the display 348. Until the overheat thermostat 218 automatically resets itself at a reset temperature (170° F. for the SureHeat ®), the controller 200 cannot be reset without encountering the trouble code 004 again. Once the overheat thermostat 218 is reset, the controller 200 can be reset using a set button 663.

If the flame check sensor 216 stops generating the flame signal during the operation of the diesel heater 10, the purge cycle is started. After completing the purge cycle, the microprocessor 208 attempts a restart. If the flame check sensor 216 detects stable combustion, the normal operation routine 392 is executed. If the flame check sensor 216 fails to detect the flame within a start time determined by the block 512, the microprocessor 208 executes the purge cycle and the trouble code 003 is output to the display 348.

By programming an automatic start time during the program routine 320 and pressing the auto button 406 on the control panel 210, the microprocessor 208 will initiate combustion and normal operation 392 at the programmed start time. Normal operation will continue until the programmed "run timer" expires or a user manually turns off the diesel heater 10 at the control panel 210. The diesel heater can be manually turned off by pressing the auto button 406.

By programming the auto temperature setpoint during the programming routine 320 and by pressing the "auto button" 406, the microprocessor initiates combustion and normal operation when the coolant temperature as sensed by the thermal sensor 220 drops below the auto temperature setpoint. The microprocessor 208 runs the diesel heater 10 until turned off by the user, shut down due to low voltage, shut down due to coolant temperature in excess of the run temperature (190° F. for the SureHeat ®) as sensed by the thermal sensor 220, or a loss of flame detected by the flame check sensor 216. If the diesel heater 10 is shut down by conditions other than temperature, the microprocessor 208 will not automatically restart. If the diesel heater 10 is shut down due to temperature, the microprocessor 208 automatically restarts when the coolant temperature sensed by the thermal sensor 220 drops below the auto temperature setpoint. To ensure that the coolant temperature adequately represents engine temperature, the water pump 230 is operated for a first period (for example, two minutes the SureHeat ®) when the measured coolant temperature drops below the temperature setpoint +10° F./ +5° C. By running the water pump 230 for the first period, coolant from the engine replaces the coolant in the diesel heater 10 to provide accurate engine coolant temperature sensing. The microprocessor 208 can be taken out of the auto temperature mode by pressing the auto button 406.

If a low voltage condition is sensed in block 574, the microprocessor 208 turns off the fuel pump 228 and initiates the purge cycle. The trouble code 001 is output to the display 348 of the control panel 210. A user can restart the diesel heater 10 by pressing the set button 663 and then the on/off button 430. The microprocessor 208 allows normal operation for a low voltage period (for example, two hours for the SureHeat ®) regardless of the input voltage monitored in the block 574. If the low voltage condition persists for the low voltage period, the microprocessor 208 will go through the purge cycle (shutting: the diesel heater 10 down), and indicate the low voltage condition (via the trouble code 001). The low voltage cycle described above can be repeated indefinitely. The purpose of the low voltage sequence is to prevent input voltage drop below a level at which the engine will be unable to start while allowing the user to heat the engine before attempting to start the engine.

The cab control option routine 650 operates only when the microprocessor 208 determines that the cab thermal sensor 214 and the cab heater fan relay 215 are connected thereto. The user can program a cab temperature setpoint using the control pad 210. When the coolant temperature sensed by the thermal sensor 220 is greater than the pump-on temperature, control of the temperature of the cab is active. If the cab temperature sensed by the cab thermal sensor 214 is 2° F. (of 1° C.) less than the cab temperature setpoint and the coolant temperature is greater than the pump-on temperature, the cab heater fan relay 215 is activated until the cab temperature is 2° F. (or 1° C.) greater than the cab temperature setpoint or until the coolant temperature drops below the pump-on temperature. At 2° F./1° C., below the cab temperature setpoint, the cab heater fan relay 215 is reactivated.

When a system failure occurs, a trouble code is sent to the control panel 210. The trouble code can include the words "trouble code" and a two digit number serving as an indication of the type of failure mode. The trouble codes can be used for trouble shooting the controller by an owner or by a service technician. The trouble codes can be removed from the display 348 by the owner using a set button 663 on the display 210. The trouble codes are stored in sequence in the memory 204 for future reference by the service technician. For example, the service technician can access five previously stored trouble codes.

The various advantages of the present invention will become apparent to those skilled in the art after a study of the foregoing specification and following claims.

What is claimed is:

1. In a diesel heater including a combustion chamber, fuel pumping means for pumping diesel fuel to said combustion chamber, air supplying means for supplying combustion air to said combustion chamber, igniting means for igniting said diesel fuel to generate combustion heat, heat exchange fluid supplying means for supplying a fluid in heat exchange relationship with said combustion heat, a thermal sensor in contact with said heat exchange fluid for generating a temperature signal related to the temperature of said heat exchange fluid, and flame detecting means for detecting an ignited diesel fuel flame and for generating a flame signal in response thereto, an improvement comprising:

a microprocessor including a memory and a plurality of input/output ports wherein said input/output ports are electrically connected to said thermal sensor, said fuel pump means, said heat transfer fluid supplying means, said igniting means, said combustion air supplying means, and said flame detecting means and wherein said memory stores a normal operating sequence, and a start-up sequence; and input means for entering current day and current time in said microprocessor memory wherein said microprocessor thereafter updates said current day and said current time, said input means for entering a lower temperature setpoint for said heat exchange fluid into said microprocessor memory, and said input means for entering a start day and start time, wherein said microprocessor automatically initiates said start-up sequence when said heat transfer fluid falls below said lower temperature setpoint or when said current day and said current time equals said start day and said start time, and wherein said microprocessor executes said normal operating sequence when said flame signal is received.

2. The improved diesel heater of claim 1 wherein said microprocessor method, further stores a failed start period for said start-up sequence and a purge cycle and wherein said microprocessor executes said purge cycle when said flame detecting means does output the flame signal during said normal operating sequence or when said flame detecting means does not output the flame signal during the failed start period in the starting sequence.

3. The improved diesel heater of claim 1 wherein said microprocessor stores a plurality of trouble codes in memory in a chronological order.

4. The improved diesel heater of claim 3 further including display means. for displaying said trouble codes.

5. The improved diesel heater of claim 3 wherein said microprocessor executes the purge cycle and stores a first trouble code when a voltage supplied by a voltage supply to said microprocessor falls below a low voltage threshold.

6. The improved diesel heater of claim 3 wherein said microprocessor initiates said start-up sequence when said flame detecting means stops generating the flame signal during normal operation.

7. The improved diesel heater of claim 6 wherein said microprocessor stores a second trouble code in said memory if said flame detecting means does not generate the flame signal throughout the start-up sequence initiated immediately after said flame detecting means stops generating the flame signal during normal operation.

8. The improved diesel heater of claim 3 wherein said microprocessor stores a third trouble code when said flame detecting means does not generate the flame signal during the failed start period in the start-up sequence.

9. The improved diesel heater of claim 3 wherein said microprocessor stores a fourth trouble code when said heat exchange fluid rises above an overheat setpoint temperature.

10. The improved diesel heater of claim 3 wherein said microprocessor monitors a fuse circuit and wherein said microprocessor executes a purge cycle if said fuse circuit is an open circuit and stores a fifth trouble code.

11. The improved diesel heater of claim 3 wherein said microprocessor monitors a fan circuit and wherein said microprocessor executes a purge cycle if said fan circuit is an open circuit and stores a sixth trouble code.

12. The improved diesel heater of claim 3 wherein said microprocessor monitors a water pump circuit and wherein said microprocessor executes a purge cycle if said water pump circuit is an open circuit and stores a seventh trouble code.

13. In a diesel heater including a combustion chamber, fuel pumping means for pumping diesel fuel to said combustion chamber, combustion air supplying means; for supplying combustion air to said combustion chamber, igniting means for igniting said diesel fuel to generate combustion heat, a heat exchanger for receiving the heated combustion air and having coolant flowing therethrough in heat exchange relationship with the heated combustion air, a coolant system connected to said heat exchanger for providing coolant thereto, coolant pumping means for pumping said coolant through said heat exchanger and said coolant system, a thermal sensor in contact with said coolant, and flame detecting means for detecting an ignited flame and for generating a flame signal in response thereto, an improvement comprising:

a microprocessor including a memory and a plurality of input/output ports wherein said input/output ports are connected to said thermal sensor, said fuel pumping means, said coolant pumping means, said igniting means, said combustion air supplying means, and said flame detecting means, and wherein said memory stores a start-up sequence; and input means for entering a low temperature setpoint for said coolant into said microprocessor memory, wherein said microprocessor activates said coolant pumping means for a first period when said coolant temperature falls below said low temperature setpoint before initiating said start-up sequence to ensure uniform temperature of the coolant in the heat exchanger and the coolant system, and wherein said microprocessor initiates said start-up sequence if said coolant temperature is below said low temperature setpoint after said coolant pumping means was activated for said first period.

14. In a diesel heater including a combustion chamber, fuel pumping means for pumping diesel fuel to said combustion chamber, combustion air supplying means for supplying combustion air to said combustion chamber, igniting means for igniting said diesel fuel to generate combustion heat, heat exchange fluid pumping means for pumping a fluid in heat exchange relationship with said combustion heat, an engine including a battery and a heat exchange system in fluid communication with said heat exchange fluid pumping means, a thermal sensor in contact with said heat exchange fluid for generating a temperature signal proportional to a temperature of said heat exchange fluid, and flame detecting means for detecting an ignited flame and for generating a flame signal in response thereto, an improvement comprising:

a microprocessor including a memory, a plurality of input/output ports, and a display, wherein said input/output ports are connected to said thermal sensor, said fuel pump means, said heat transfer fluid pumping means, said igniting means, said combustion air supplying means, and said flame detecting means, wherein said memory stores a normal operating sequence, and a start-up sequence, and wherein said microprocessor memory stores a purge sequence and said microprocessor executes said purge sequence when said microprocessor detects a voltage input from the battery less than an operating voltage threshold during said normal operating sequence.

15. The improved diesel heater of claim 14 wherein said microprocessor outputs a low voltage trouble code to said display if said microprocessor detects said input voltage less than said operating voltage threshold.

16. The improved diesel heater of claim 15 wherein if a user initiates said start-up sequence after said low voltage trouble code is displayed, said microprocessor executes said start-up sequence and said normal operating sequence for a first period.

17. The improved diesel heater of claim 16 wherein said voltage input remained below said operating voltage threshold during said first period, said microprocessor executes said purge sequence and displays said low voltage trouble code to allow the user to heat said heat exchange fluid in said heat exchange system of said engine before starting said engine without fully draining said battery.

18. In a diesel heater connected to a cooling system of a diesel engine of a vehicle including a passenger cab, the diesel heater including a combustion chamber, fuel pumping means for pumping diesel fuel to said combustion chamber, combustion air supplying means for supplying combustion air to said combustion chamber, igniting means for igniting said diesel fuel to generate combustion heat, heat exchange fluid supplying means for supplying a fluid from the cooling system of the diesel engine in heat exchange relationship with the combustion heat, a thermal sensor in contact with said heat exchange fluid for generating a temperature signal proportional to a temperature of said heat exchange fluid, and flame detecting means for detecting an ignited diesel fuel flame and for generating a flame signal in response thereto, an improvement comprising:

a microprocessor including a memory and a plurality of input/output ports wherein said input/output ports are electrically connected to said thermal sensor, said fuel pump means, said heat transfer fluid supplying means, said igniting means, said combustion air supply means, and said flame detecting means and wherein said memory stores a normal operating sequence and a start up sequence;

cab temperature sensing means for sensing temperature in said passenger cab;

cab heating means connected to said heat exchange fluid supplying means for actuating a fan to direct air into heat exchange relationship with said heated fluid from said heat exchange fluid supplying means; and input means for setting a cab temperature setpoint in said microprocessor memory, wherein said microprocessor is connected to said cab temperature sensing means and said cab heating means, and wherein said microprocessor actuates said cab heating means during said normal operating mode to maintain said cab temperature at said cab temperature setpoint.

19. The improved diesel heater of claim 18 wherein said microprocessor actuates said cab heating means only when said heat exchange fluid supplying means is activated.

20. A method of starting a diesel fuel fired heater comprising the steps of:

a) starting a first timing means for timing first, second, third and fourth periods;

b) energizing an igniting means for igniting diesel fuel supplied to a combustion chamber and starting said timing means;

c) energizing a combustion air supply means for supplying combustion air to said combustion chamber after said first period:

d) operating a fuel pumping means for pumping diesel fuel to said combustion chamber at a first frequency after said second period;

e) starting a second timing means for timing a fifth period and stopping said fuel pump means;

f) operating said fuel pumping means at a second frequency after said third period;

g) starting a third timing means for timing a sixth period after said fifth period;

h) stopping said fuel pumping means after said sixth period;

i) starting a fourth timing means for timing a seventh period;

j) operating said fuel pumping means after said seventh period; and k) starting said third timing means.

21. The method of claim 17 wherein steps h), i), j) and k) are repeated until said fourth period or until a flame detecting means for detecting the ignited diesel fuel detects said diesel fuel flame.

* * * * *